No. 692,011. Patented Jan. 28, 1902.
M. HANSEN.
BARLEY BEARDER AND CEREAL POLISHER.
(Application filed Sept. 9, 1901.)
(No Model.)
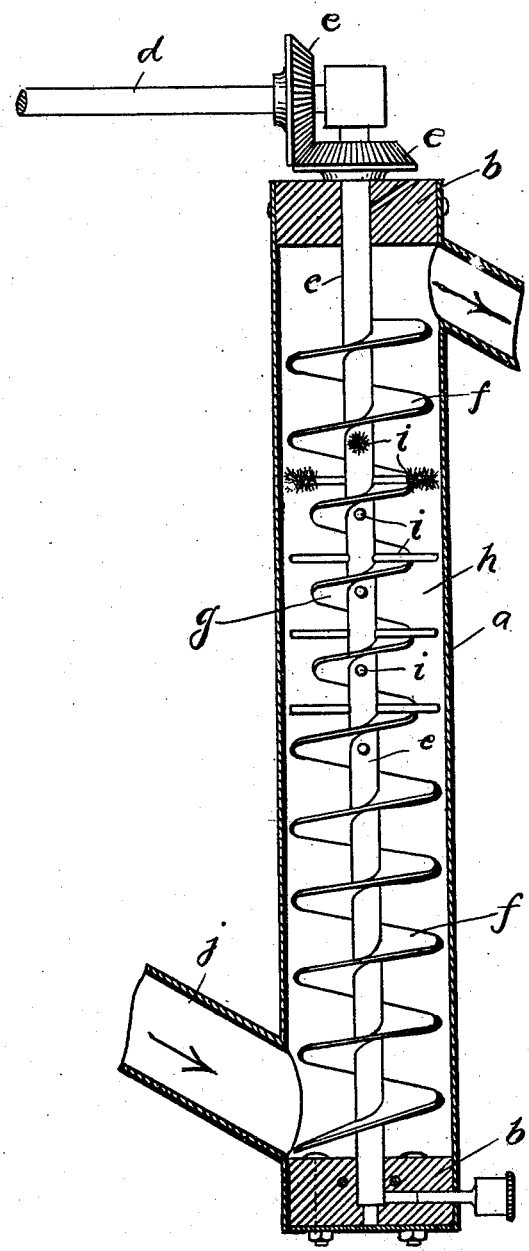
WITNESSES:
K. Lockwood Nevins.
Cecelia Powning.
INVENTOR.
Martin Hansen
BY
Francis M. Wright.
ATTORNEY.

UNITED STATES PATENT OFFICE.

MARTIN HANSEN, OF LIVERMORE, CALIFORNIA.

BARLEY-BEARDER AND CEREAL-POLISHER.

SPECIFICATION forming part of Letters Patent No. 692,011, dated January 28, 1902.

Application filed September 9, 1901. Serial No. 74,724. (No model.)

*To all whom it may concern:*

Be it known that I, MARTIN HANSEN, a citizen of the United States, residing at Livermore, in the county of Alameda and State of California, have invented certain new and useful Improvements in Barley-Bearders and Cereal-Polishers, of which the following is a specification.

My invention relates to an improved barley-bearder and cereal-polisher, the object of my invention being to provide an apparatus to be used in connection with threshing-machines for all kinds of cereals, especially barley, so as to obviate the necessity of threshing the barley so close as to skin and crack the kernels, which would render the kernel unfit for malting. If the barley is not threshed close, there are always left a great many beards on the kernels.

The object of this apparatus is to remove the beards from the kernels by rubbing and also to polish the grain, thus putting it in better condition for the market.

My invention therefore resides in the novel construction, combination, and arrangement of parts for the above ends, hereinafter fully specified, and particularly pointed out in the claims.

In the accompanying drawing the figure is a vertical section of the apparatus, certain parts being also shown in side elevation.

Referring to the drawing, $a$ represents a vertical tube having secured therein heads $b$, forming bearings for a vertical shaft $c$, driven from a horizontal shaft $d$ by means of miter-wheels $e$. Upon said shaft $c$ is mounted a conveying-auger $f$, which fits snugly within the tube $a$ in the upper and lower portions thereof, but is reduced in diameter in the mediate portion, as shown at $g$. There is thereby formed around said reduced portion of the auger a rubbing-chamber $h$, in which the grain is packed, and while in said chamber it is rubbed by means of rubbing pins or brushes $i$, secured to the central portion of the shaft $c$ and extending radially therefrom within said rubbing-chamber.

The operation of the apparatus is as follows: The apparatus is interposed between the threshing-machine and the recleaner of the same. The grain flows into the apparatus from a spout $j$ at the bottom thereof and is conveyed up to the rubbing-chamber, where the tendency is for it to pack together; but before it is pushed upward by the motion of the auger and while in said rubbing-chamber it is rubbed by the pins $i$ on the shaft $c$, which makes from five hundred to seven hundred revolutions per minute. This rubbing process is applied while the grain is being forced upward through the rubbing-chamber and into the upper portion, where the conveyer $f$ catches it and throws it out, completing the process. The beards, white cap of wheat, dust, &c., will be conveyed to the recleaner of the threshing-machine and will be taken out by said recleaner. As may be readily seen, it is impossible to crack or skin the grain during this process, so that the grain is furnished in excellent condition for malting. This apparatus does not require regulation or adjustment, as the grain is always packed within the rubbing-chamber whether it is fed fast or slow. The reduced portion of the auger tends by centrifugal force to throw the grain outward, where it is acted upon by the rubbing-pins.

The apparatus will also be found effective and valuable for cleaning beans.

I claim—

1. In an apparatus of the character described, the combination of a tube, a shaft therein, an auger on said shaft fitting closely within the tube in the lower portion thereof, said auger being reduced in size on an upper or further portion thereof, and rubbing devices extending from said shaft in said upper or further portion, substantially as described.

2. In an apparatus of the character described, the combination of a tube, a shaft revolving therein, an auger on said shaft fitting closely within the lower portion of the tube and reduced in size in an upper portion, and rubbing devices mounted on said shaft in said upper portion, substantially as described.

3. In an apparatus of the character described, the combination of a tube, a shaft rotating therein, an auger mounted on said shaft and fitting closely within said tube in the ends thereof, and being reduced in a mediate portion thereof, and rubbing devices extending from said shaft in said mediate portion, substantially as described.

In witness whereof I have hereunto set my hand in the presence of two subscribing witnesses.

MARTIN HANSEN.

Witnesses:
P. H. McVICAR,
AUGUST HÄGEMANN.